United States Patent [19]

Dixon et al.

[11] 4,104,264
[45] Aug. 1, 1978

[54] END CAPPED POLYALKYLENE CARBONATES HAVING IMPROVED THERMAL STABLITY

[75] Inventors: Dale D. Dixon, Kutztown; Michael E. Ford, Trexlertown; Gerald J. Mantell, Allentown, all of Pa.

[73] Assignee: Air Products & Chemicals, Inc., Allentown, Pa.

[21] Appl. No.: 794,263

[22] Filed: May 5, 1977

[51] Int. Cl.$^2$ ............................................. C08G 63/62
[52] U.S. Cl. .................................. 528/370; 260/463; 528/372
[58] Field of Search .......... 260/2 BP, 77.5 D, 47 XA, 260/463

[56] References Cited

U.S. PATENT DOCUMENTS 3,177,179  4/1965  Lee et al. .............................. 260/47

*Primary Examiner*—Theodore E. Pertilla
*Attorney, Agent, or Firm*—Russell L. Brewer; Barry Moyerman

[57] ABSTRACT

Polycarbonates, of the type formed by reacting an aliphatic or cycloaliphatic 1,2-monoepoxide with carbon dioxide and having substantially alternating units of epoxide and carbon dioxide, are improved in thermal stability by reacting the free hydroxyl groups thereon with a hydroxyl reactive sulfur compound.

The resulting end capped polycarbonates are useful for producing molded products, films, and packages which are resistant to thermal degradation.

15 Claims, No Drawings

END CAPPED POLYALKYLENE CARBONATES HAVING IMPROVED THERMAL STABLITY

BACKGROUND OF THE INVENTION

1. Field

This invention relates to polycarbonates having improved thermal stability and to a process for preparing such polycarbonates.

2. Description of the Prior Art

In recent years, there has been extreme interest expressed in a class of high molecular weight polycarbonates formed by reacting an aliphatic or cycloaliphatic epoxide with carbon dioxide. These high molecular weight polycarbonates are useful as molding compositions in the formation of fibers and articles. Typically, the polycarbonates are produced by reacting an epoxide, e.g. ethylene oxide, propylene oxide, isobutylene oxide with carbon dioxide under pressure in the presence of an organometallic catalyst. Amplification of this description of the process is shown in U.S. Pat. Nos. 3,585,168, 3,900,424 and 3,953,383. Variations in this basic process are reported in U.S. Pat. Nos. 3,706,713, 3,689,462 and 3,699,079.

Hydroxyl groups on low molecular weight liquid polycarbonates of the type formed by reacting aromatic polyhydric alcohol and phosgene or those obtained by reacting a dihydric alcohol and bischlorocarbonate have been capped with monomers to form solid polymers. Examples of capping agents include disubstituted acids for forming polyester-polycarbonates and isocyanates to form polyurethane-polycarbonates. Exemplary formulations are shown in U.S. Pat. Nos. 3,248,414; 2,999,844; 3,544,657; 3,897,391; and 3,689,462.

SUMMARY OF THE INVENTION

This invention relates to polycarbonates, particularly polyalkylene carbonates formed by reacting an epoxide and carbon dioxide, having improved thermal stability. The improved thermal stability of the polyalkylene carbonates is imparted by reacting the free hydroxyl groups on the polyalkylene carbonate with a hydroxyl reactive sulfur compound of the type capable of forming an oxygen-sulfur bond preferably without forming a hydroxyl group on the capping sulfur atom. This reaction results in the formation of an oxygen-sulfur bond which is more stable to depolymerization than the oxygen-hydrogen bond, and thereby enhances thermal stability.

Accordingly, an aspect of this invention is to provide a normally solid polycarbonate with substantially alternating units of epoxide and carbon dioxide of improved thermal stability.

It is another aspect of the invention to form polycarbonates suited for producing molded products which are more resistant to thermal degradation than are molded products prepared from prior art polycarbonates.

It is a further aspect of the invention to provide polyalkylene carbonates that can be processed over a wider temperature range than was previously possible and to promote their life under normal use conditions.

It is still a further object to provide polyalkylene carbonates which can be utilized for the manufacture of films and packages and the in situ pasteurization of contents therein.

DESCRIPTION OF THE PREFERRED EMBODIMENT

The polycarbonates suited for practicing this invention are normally solid at room temperature (70° F) and atmospheric pressure and are represented by the formula:

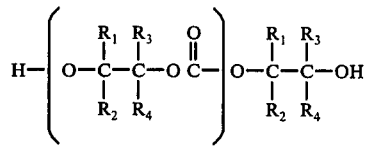

wherein:

$R_1$ is a hydrogen atom, a halomethyl group, or a hydrocarbyl group having from 1 to 6 carbon atoms;

$R_3$ is hydrogen, a halomethyl group or a hydrocarbyl group having from 1 to 6 carbon atoms;

$R_2$ and $R_4$ are hydrogen, or a hydrocarbyl group having from 1 to 6 carbon atoms; or $R_1$, $R_2$, $R_3$ and $R_4$ are combined together constituting a carbocyclic ring of from 4 to 7 carbon atoms;

The polycarbonates represented by the formula above are normally solid at room temperature (70° F) and atmospheric pressure and contain alternating units of epoxide and carbon dioxide. These polycarbonates are formed by reacting an epoxide and carbon dioxide to form high molecular weight polycarbonates of from about 50,000 to 500,000, and preferably a molecular weight of from about 75,000 to 150,000. This converts to a plurality of repeating units ($n$) (as shown in a subsequent formula) of from about 250 to 6,500, and preferably from 500 to 1,500.

The epoxides suited for forming the polycarbonates generally are 1, 2-epoxides which are conventionally used in forming polycarbonates represented by the formula above. The epoxides can be substituted with a plurality of organo groups represented by $R_1$, $R_2$, $R_3$ and $R_4$, as for example hydrocarbyl groups which, by definition, include lower alkyl, alkenyl, cycloaliphatic, aryl groups, and substituted groups, e.g. chlorine, alkyl, hydroxyl, ester and aldehyde groups. Typically, the pendent groups on the epoxide reactant are hydrogen, lower alkyl, e.g. methyl and ethyl, or phenyl groups. Examples of suitable epoxides include ethylene oxide, propylene oxide, styrene oxide, isobutylene oxide, 2,3 butylene oxide, epichlorohydrin, butylene oxide, diphenylethylene oxide, trimethylethylene oxide, cyclohexane epoxide, methyl cyclohexane epoxide, ethylene cyclohexane epoxide, and the like. Of these, ethylene and propylene oxide are preferred.

End capping of the normally solid polycarbonates of this invention is accomplished by reacting the polycarbonate with a hydroxyl reactive sulfur compound under conditions effective for replacing the hydrogen atom and forming an oxygen-sulfur bond. Any hydroxyl reactive sulfur compound that is capable of (1) reacting with the active hydrogen atom for forming an oxygen-sulfur bond with the polymer, and (2) does not effect substantial polymer degradation and degeneration under the reaction conditions, can be used in practicing this invention. Preferably, the hydroxyl reactive sulfur compound does not result in the formation of a hydroxyl group on the capping sulfur atom. Further, these hydroxyl reactive sulfur compounds may be substituted with any group, e.g. nitro, halo, alkyl, sulfonyl, etc. so long as it does not result in polymer degradation.

Classes of hydroxyl reactive sulfur compounds which can be used for end capping the free hydroxyl groups on the polyakylene carbonates of this invention include: sulfonyl halides such as ethane sulfonyl chloride, p-toluene sulfonyl chloride, p-nitrobenzene sulfonyl chloride, and methane sulfonyl chloride, sulfonyl cyanides and sulfonyl azides as for example, benzenesulfonyl cyanide, benzene sulfonyl azide, methane sulfonyl cyanide etc.; sulfinyl halides e.g. methane sulfinyl chloride, benzene sulfinyl chloride etc. sulfenyl halides, e.g., p-nitrobenzene sulfenyl chloride, benzene sulfenyl chloride; sulfuryl halides, e.g., benzene sulfuryl chloride, p-toluene sulfuryl chloride; sulfuryl chloride; sulfonate esters, e.g., p-nitrophenylbenzene sulfonate, neopentyl benzene sulfonate; sulfenyl anhydrides such as benzenesulfenyl anhydride, ethane sulfenyl anhydride; disulfides e.g. dimethyl disulfide and diphenyl disulfide.

Generally, the hydroxyl reactive sulfur compounds employed are chlorides. Other halogen atoms can be employed in place of the chlorine atom, e.g. bromine and iodine. In the same class as halogen atoms are the cyano and azide groups which are often referred to as sulfonyl pseudo halides and sulfinyl pseudo halides. It can also be observed from the above class of compositions that the organo portion of the sulfur compound can be alkyl, aromatic, aralkyl group or it can be substituted with an electron withdrawing group e.g. a nitro group, chlorofluoro group, and others commonly known in the art.

In end capping the free hydroxyl groups on the polyalkylene carbonate resins, the hydroxyl groups are contacted with the hydroxyl reactive sulfur compound under conditions sufficient for effecting reaction and capping substantially all of the hydroxyl groups. Generally, because the polymer is a solid, it is preferable to end cap the polyalkylene carbonate by forming a dispersion of polyalkylene carbonate and hydroxyl reactive compound, by milling the polymer and hydroxyl reactive sulfur compound or by extruding the compounds. In the first case, the polyalkylene carbonate is dispersed in an inert solvent or carrier such as tetrahydrofuran, chloroform, dioxane, benzene, acetone or methylene chloride, and the reaction carried out in that medium. In milling, considerable care must be exercised to insure that the temperature of the polyalkylene carbonate resin does not exceed the thermal degradation temperature.

In forming the end capped polycarbonate resin, sufficient hydroxyl reactive sulfur compound is blended and contacted with the polyalkylene carbonate resin to react with substantially all of the free hydroxyl groups. To insure that substantially all of the hydroxyl groups are reacted, at least 20% of the stoichiometric excess of hydroxyl reactive sulfur compound is mixed with the polyalkylene carbonate.

After end capping, the polyalkylene carbonate polymer is more nearly represented by the formula:

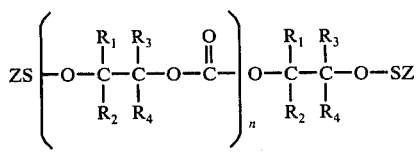

wherein $R_1$ is a halomethyl or a hydrogen, or a hydrocarbyl group having from 1 to 6 carbon atoms;

$R_3$ is hydrogen, a halomethyl group or a hydrocarbyl group having from 1 to 6 carbon atoms;

$R_2$ and $R_4$ are hydrogen or a hydrocarbyl group having from 1 to 6 carbon atoms; or $R_1$, $R_2$, $R_3$ and $R_4$ are combined together constituting a carbocyclic ring of from 4 to 7 carbon atoms; and $n$ is a number from 250 to 6,500;

Z is the remainder of a hydrocarbyl radical having from 1 to 20 carbon atoms and substituted derivatives thereof.

In the above formula, Z by definition, is the remainder of a hydrocarbyl group where the oxygen atom is bonded to a sulfur atom and the valences pendent from that sulfur atom are satisfied by attachment to another sulfur atom or other atom, e.g. hydrogen, halogen, or oxygen. The essential feature is to end cap the hydroxyl group with a sulfur compound sufficiently reactive to form the oxygen-sulfur bond as those groups pendent from that sulfur atom can be any atoms sufficient to satisfy the normal valences, e.g. 2,4 or 6 on the sulfur as represented by Z.

The following examples are provided to illustrate preferred embodiments of this invention, and are not intended to restrict the scope thereof. All temperatures are in degrees centigrade.

EXAMPLE 1

A 7.5 gram sample of a polyethylene carbonate (PEC) formed by the procedure of Example 1 in U.S. Pat. No. 3,900,424 having alternating units of ethylene oxide and carbon dioxide, a molecular weight of 100,000 and a melting point of about 190°-200° C was dissolved in 100 millileters chloroform. The polyethylene carbonate had free hydroxyl groups as evidenced by the presence of frequencies in the infrared spectrum at 3480 cm$^{-1}$ and 3640 cm$^{-1}$. The free hydroxyl groups assuming, $1.5 \times 10^{-4}$ mols hydroxyl group in the poly ethylene carbonate, were end capped by adding (0.05 mols) methane sulfonyl chloride and (0.05 mols) pyridine to the polyethylene carbonate solution and then stirring at ambient temperature (20°-25° C) for about 40 hours. The reaction medium then was added slowly to methanol and a precipitate formed which was removed by filtration. Residual solvent in the precipitate was removed by placing the polymer in a vacuum. Infrared analysis of the resulting polymer showed that hydroxyl groups were reacted and capped with methane sulfonyl units.

EXAMPLE 2

The procedure of Example 1 was followed except that benzene sulfonyl chloride was substituted for methane sulfonyl chloride, thus providing a polyethylene carbonate end capped with benzene sulfonyl groups.

EXAMPLE 3

The procedure of Example 1 was followed except that polypropylene carbonate was substituted for polyethylene carbonate, thus providing a polypropylene carbonate capped with methanesulfonyl groups.

EXAMPLE 4

Untreated polyethylene and polypropylene carbonate, i.e. those having terminal hydroxyl groups and end capped polyethylene and polypropylene carbonate resins, were evaluated for thermal stability by heating a 0.005 gram sample of the resin at a rate of 2½°/min. from a temperature of 120° C to the decomposition temperature as indicated by a weight loss of 5% based on the weight of the sample. The atmospheric environments used in the evaluation of the samples were air and nitrogen. The results of the evaluation are noted in Table 1

TABLE 1

| Polycarbonate | Decomposition Temperature °C Untreated Polycarbonate | Decompisition Temperature °C End Capped Polycarbonate |
|---|---|---|
| Ex. 1 Air (PEC) | 210 | 237 |
| Ex. 1 N₂ (PEC) | 205 | 244 |
| Ex. 2 Air (PEC) | 210 | 242 |
| Ex. 2 N₂ (PEC) | 205 | 242 |
| Ex. 3 Air PPC | 218 | 246 |
| Ex. 3 N₂ PPC | 215 | 251 |

The above results show the increased thermal stability of the resins where the free hydroxyl groups were end capped by the formation of the O-S bond. These resins, because of their higher degree of thermal stability, can be used for a variety of applications.

What is claimed is:

1. A process for improving the thermal stability of a normally solid polyalkylene carbonate having substantially alternating epoxide and carbon dioxide units and having a plurality of free hydroxyl groups represented by the formula:

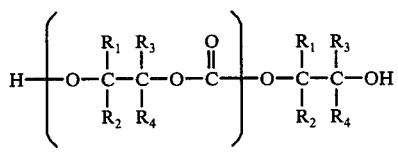

wherein:
- $R_1$ is hydrogen, a halomethyl group, or a hydrocarbyl group having from 1 to 6 carbon atoms;
- $R_3$ is hydrogen, a halomethyl group, or a hydrocarbyl group having from 1 to 6 carbon atoms;
- $R_2$ and $R_4$ are hydrogen or a hydrocarbyl group having from 1 to 6 carbon atoms; or
- $R_1$, $R_2$, $R_3$ and $R_4$ are combined together constituting a carbocyclic ring of from 4 to 7 carbon atoms;

which comprises end-capping at least a portion of the free hydroxyl groups of said polyalkylene carbonate by reacting said hydroxyl groups with a hydroxyl reactive sulfur compound having the ability to replace the active hydrogen atom on said hydroxyl group for forming an oxygen-sulfur bond.

2. The process of claim 1 wherein $R_2$ and $R_4$ are hydrogen atoms.

3. The process of claim 2 wherein $R_1$ and $R_3$ are hydrogen, a lower alkyl group having from 1 to 2 carbon atoms, or a phenyl group.

4. The process of claim 3 wherein said hydroxyl reactive sulfur compound is selected from the group consisting of a sulfonyl halide, sulfenyl halide, sulfonate ester, disulfide, and sulfonyl cyanide.

5. The process of claim 3 wherein said end-capping is accomplished by dispersing said polycarbonate in an inert carrier, reacting the polycarbonate with said hydroxyl reactive organic compound, and then recovering the resulting end-capped polycarbonate from said inert carrier.

6. The process of claim 4 wherein said hydroxyl reactive sulfur compound is a monofunctional sulfur compound.

7. The process of claim 4 wherein $R_3$ is hydrogen atom, or a methyl group.

8. The process of claim 7 wherein $R_1$ is hydrogen, or a phenyl group.

9. The process of claim 8 wherein $R_1$ and $R_3$ are hydrogen atoms.

10. The process of claim 9 wherein said hydroxyl reactive sulfur compound is a sulfonyl chloride.

11. An end capped polycarbonate having improved thermal stability represented by the formula:

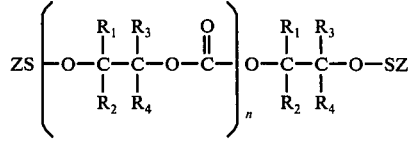

wherein:
- $R_1$ is hydrogen, a halomethyl group, or a hydrocarbyl group having from 1 to 6 carbon atoms;
- $R_3$ is hydrogen, a halomethyl group, or a hydrocarbyl group having from 1 to 6 carbon atoms;
- $R_2$ and $R_4$ are hydrogen or a hydrocarbyl group having from 1 to 6 carbon atoms; or
- $R_1$, $R_2$, $R_3$ and $R_4$ are combined together constituting a carbocyclic ring of from 4 to 7 carbon atoms;
- $n$ is a number of from about 250 – 6,500 and
- Z is the residual of a hydrocarbyl radical having from 1 to 20 carbon atoms and substituted derivatives thereof.

12. The polycarbonate of claim 11 wherein $R_2$ and $R_4$ are hydrogen atoms.

13. The polycarbonate of claim 12 wherein $R_1$ is selected from the group consisting of hydrogen and phenyl.

14. The polycarbonate of claim 13 wherein $R_3$ is selected from the group consisting of hydrogen and methyl groups.

15. The polycarbonate of claim 14 wherein $n$ is from about 500 to 1,500.

* * * * *